Nov. 2, 1965    F. E. CARLSON ETAL    3,215,581
FOAMING APPARATUS
Filed March 4, 1963    3 Sheets-Sheet 1
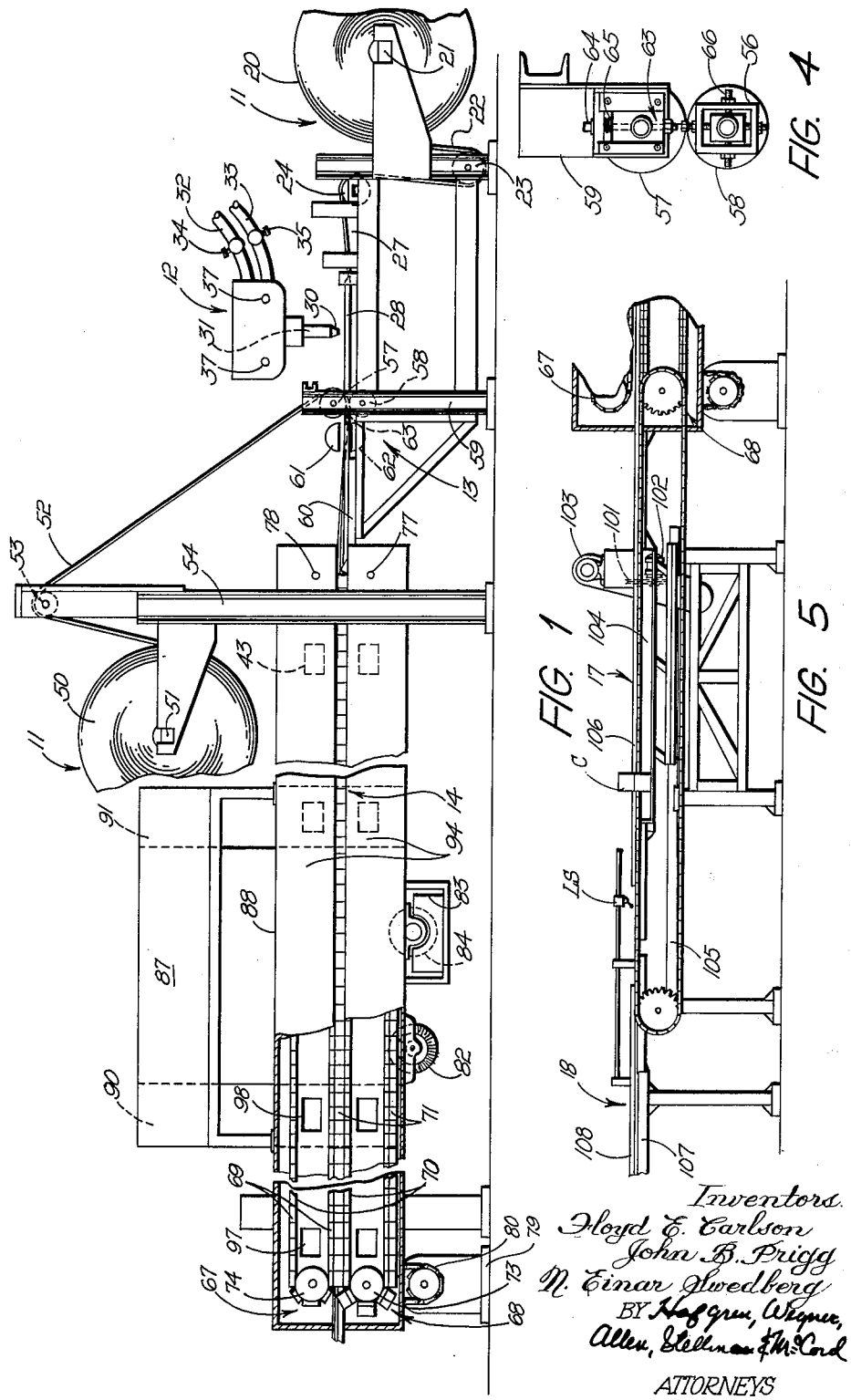

Nov. 2, 1965  F. E. CARLSON ETAL  3,215,581
FOAMING APPARATUS
Filed March 4, 1963  3 Sheets-Sheet 2
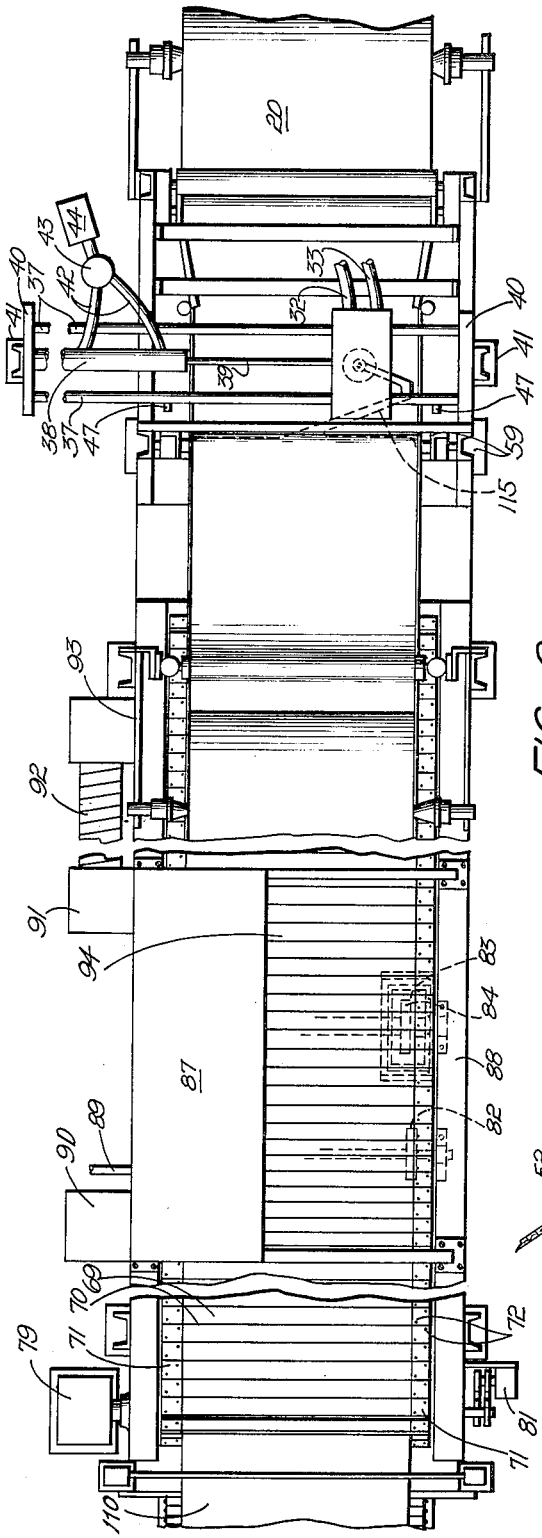

United States Patent Office 3,215,581
Patented Nov. 2, 1965

3,215,581
FOAMING APPARATUS
Floyd E. Carlson, John B. Prigg, and Nile Einar Swedberg, Rockford, Ill., assignors, by mesne assignments, to Air Products and Chemicals Inc., Philadelphia, Pa., a corporation of Delaware
Filed Mar. 4, 1963, Ser. No. 262,482
4 Claims. (Cl. 156—443)

This invention relates to the production of foamed articles and more particularly relates to the production of roofing material especially in sheet form. The invention further relates to a continuous process for producing such foamed materials and an apparatus in which the process may be carried out.

It is a general object of this invention to provide a new and useful article and a method and apparatus for making the same.

Another object of this invention is to provide a new and useful method and apparatus for making backed sheets of foamed plastic material which may be used as roofing material having good insulating value.

Still another object of this invention is the production of roofing material of low density including foamed plastic material laminated to a backing material and having fairly uniform density throughout its thickness with only minimal amounts, if any, of the more dense crust which often forms on a foam adjacent a backing material.

Yet another object of this invention is the production of foamed materials in accordance with any of the foregoing objects wherein there are provided opposing upstanding dams defining the lateral limits of expansion of the liquid foamable resin mix in forming the foamed product.

A further object of this invention is the production of such foamed material in accordance with any of the foregoing objects wherein two sheets of backing material are retained spaced from each other while introducing a liquid foamable resin mix therebetween and wherein the foamable mix is spread in uniform thickness between the two sheets of backing material, with selective adjustability provided to enable the formation of foamed plastic articles of preselected thickness.

It is another object of this invention to provide for the production of such foamed materials in accordance with any of the foregoing objects wherein two sheets of backing material, between which the liquid foamable resin mix is disposed, are preheated at a temperature lower than the mix curing temperature before the mix is subjected to curing temperature.

Other objects, including the regulation of the process and apparatus for a variety of desired results, will be apparent from the following detailed description taken in connection with the accompanying drawings, in which:

FIGURE 1 is a side view and partial section of an embodiment of apparatus usable in accordance herewith;

FIGURE 2 is a top plan of the apparatus of FIGURE 1, partially cut away to show interior structure;

FIGURE 3 is an enlarged side view of a portion of the apparatus of FIGURE 1;

FIGURE 4 is an enlargement of a portion of FIGURE 1 with parts removed to show the roller assembly in more detail;

FIGURE 5 illustrates a cutting zone for use with the structure of FIGURE 1;

FIGURE 8 is a perspective view of a form of roofing material in accordance herewith which may be made by the apparatus illustrated in FIGURES 1–3.

Figure 6:
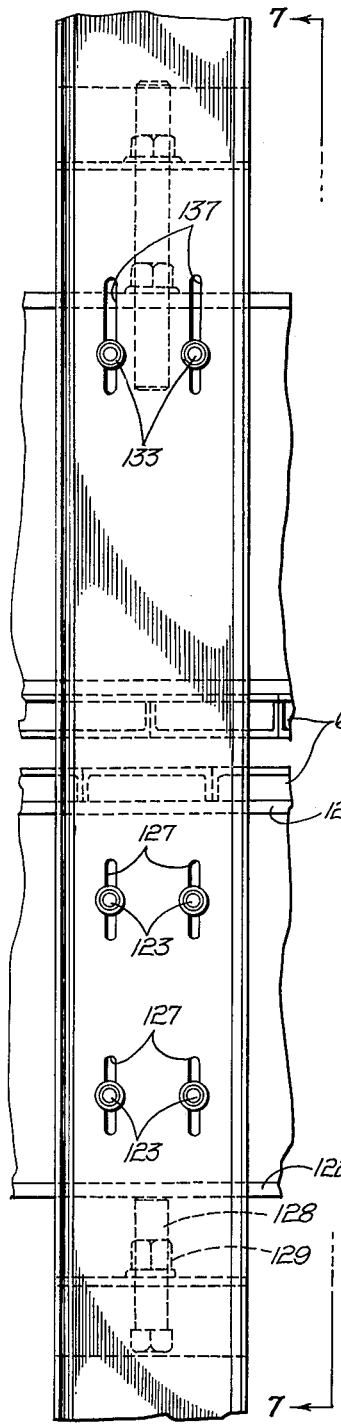
FIGURE 6 is an enlargement of a portion of FIGURE 1 showing the interior conveyor mounting structure in dotted lines.

While an illustrative embodiment of the invention will be described in detail herein with reference to the drawings, the invention is susceptible of embodiment in many different forms, and it should be understood that the present disclosure is to be considered as an exemplification of the principles of the present invention and is not intended to limit the invention to the embodiment particularly described.

Turning now to the drawings and referring first to FIGURES 1–7, there is illustrated an apparatus for continuous operation in the production of sheet roofing material. Generally, the apparatus includes a supply of backing material indicated by the reference numeral 11, a resin mix supply system indicated at reference numeral 12, a preheating zone 13, a curing zone 14 in which the foamed mix may be cured, a cutting device 17 for cutting the product foamed material into desired lengths and a receiver 18 for receiving finished roofing panels.

Referring more particularly to the supply of backing material, there are provided two rolls of such material for use herein. The backing material may be any of the materials usable for covering foamed sheets. For example, the backing material may be a flexible backing material such as paper, chemically treated or impregnated paper, plastic film or sheet, aluminum sheet material, veneer such as wood veneer, steel sheet material, tissue backed aluminum foil, or the like, and is preferably a vapor barrier material, especially where the foamed plastic material is to be used as insulation or roofing.

A first roll 20 of such backing material is rotatably mounted at 21 to suitable supporting framework and supplies a sheet 22 of backing paper which extends around rollers 23 and 24 and thence through the liquid foamable resin mix supply, preheat and curing zones. A paper folder 27 of conventional design is provided for folding opposing upstanding edges, e.g., ⅜ inch high, as shown at 28, along each lateral edge of paper 22, prior to progression of the paper 22 through the liquid foamable resin mix supply zone 12.

Turning now to the resin mix supply zone, a laterally reciprocable nozzle 30 is mounted over a resin mix receiving station, at which station paper 22 receives the resin mix from nozzle 30. Nozzle 30 extends downwardly from a mixer chamber 31 which is supplied with liquid resin mix components through supply lines 32 and 33 which may be controlled such as by valves 34 and 35. Supply lines 32 and 33 are of flexible tubing to permit the reciprocable movement of mixing chamber 31 and nozzle 30 depending therefrom. Valves 34 and 35 are included merely for simplicity in showing control of flow of fluids through lines 32 and 33. Preferably, suitable devices may be incorporated in the supply system for more exact metering of components to mixing chamber 31; an example of such supply system is described in co-pending application, Serial No. 266,589 filed on or about March 20, 1963 and assigned to the assignee of this application. Of course, it is to be understood that additional supply lines for mixing chamber 31 may be included as necessary or desired with regard to formation of a particular system and other suitable mixing and nozzle arrangements may be used. It is important only that the supply apparatus be capable of depositing a liquid foamable composition on the backing material.

In the illustrated supply system, mixer 31 is slidably mounted on a pair of parallel guide rods 37. A double-acting hydraulic or air cylinder 38 is provided to slide or reciprocate mixer 31 laterally with respect to backing material 22 therebeneath. The armature or piston stem of cylinder 38 is indicated by reference numeral 39 and has its outer end fixed to mixer 31, with its inner end carrying a piston reciprocal within cylinder 38. Suitable support members for guide rods 37 and hydraulic cylinder 38 are provided as indicated by reference numeral 40. Support members 40 are in turn supported from suitable braces or framing 41.

Pressure lines 42 are flexible and supply pressure alternately to either end of cylinder 38 for reciprocation of the piston therein in normal manner. The source of pressure 44 may be a tank or other supply of compressed air and the pressure is alternately connected by valve 43 to one and then the other of lines 42 for supply of pressure to first one end and then the other of cylinder 38. While pressure is being supplied by valve 43 to one of lines 42, the other of lines 42 is vented by valve 43.

Valve 43 is a solenoid valve and is responsive to electrical signals from switches 47. Each of switches 47 mounted on one of guides 37, is tripped by the lateral movement of mixer 31 to actuate valve 43 to vent one and pressurize the other of lines 42. The hydraulic or air cylinder system for reciprocating mixer 31 and nozzle 30 is conventional and will be apparent to those in the art.

Returning now again to the supply of backing material, a second roll 50 of backing material is rotatably mounted at 51 to a suitable bracket secured to leg 54. Roll 50 supplies a sheet 52 of backing material over the upper reach of roller 53. Rollers 23 and 53 are spring-loaded to take up any slack in sheets 22 and 52 respectively.

A pair of rollers 57 and 58 are horizontally disposed and generally vertically aligned and spaced slightly from each other. Rollers 57 and 58 are disposed to receive backing sheet 22 with the liquid foamable composition on its upper surface and with backing sheet 52 disposed thereover. The gap between rollers 57 and 58 is sufficiently small to cause sandwiching of the liquid foamable composition between the two backing sheets as the liquid and backing sheets pass between rollers 57 and 58.

As best seen in FIGURE 4, each of the rollers 57 and 58 has a stationary shaft with the roller portion rotatably mounted thereon. The shaft of roller 57 is located by two dovetail slides 63 in suitable framework at each end of the roller, securing of the roller being by means of adjusting screws 64 and spring 65 provided in dovetail slides 63. Adjusting screws 64 provide adjustability of roller 57 and the gap between roller 57 and 58. The roller 58 is located in blocks 56 at each end of the roller. The blocks are secured to legs 59 and have adjusting screws 66 for alignment of the roller.

Immediately downstream from the liquid foamable compound and paper supply zones is a preheating zone indicated generally at 13 (FIGURE 1). In this zone a platform 60 is provided supported by leg 59. Between platform 60 and rollers 57 and 58, there are mounted an upper paper heater 61 and a lower paper heater 62; heaters 61 and 62 are provided in the form of heating lamps disposed on either side of the sandwiched resin mix and backing material as the sandwich proceeds forward from rollers 57 and 58. The paper heaters 61 and 62 define a preheating zone for heating the two sheets of backing paper to a temperature sufficient to inhibit the formation of high density skin in the foam adjacent the backing sheets, which skin may normally be formed during curing procedures.

The temperature of the preheat zone, in a preferred application, may be maintained below the temperature of the curing zone which will be discussed hereinbelow, i.e., the sheets of backing material are heated to a temperature less than the curing temperature of the foamable resin mix therebetween and preferably to a temperature greater than the vaporization temperature of the foaming agent in the resin mix. A suitable temperature may be, for example, a temperature in the range of 100 to 120° F. In the preferred system the sandwich will begin expanding in the preheat zone, increasing the sandwich thickness, and will continue expanding as the sandwich enters the curing zone 14.

Curing zone 14 is defined and vertically confined by the lower reach of an upper conveyor 67 and the upper reach of a lower conveyor 68. The conveyors are equal in length and sufficiently long to cure the liquid foamable composition, e.g., to a rigid board. Each conveyor is composed of a belt of laterally disposed parallel plates 69 which are hinged as at 70 to provide a continuous belt. Plates 69 are of channel configuration with the channel legs disposed inwardly of the conveyor. Dam members or blocks 71 are releasably mounted to each of the plates 69 of the lower conveyor 68 by means of bolts 72 threaded into plates 69. Dams 71 are aligned throughout the length of lower conveyor 68.

It will be noted that two linear arrays of dams 71 are provided, each array being separated from the other a distance approximately equal to the desired width of foam material to be produced. The dams 71 are of equal height and extend from their attachments on the upper reach of conveyor 68 to contact the lower reach of conveyor 67 and laterally define and confine the curing zone 14. The height of dams 71 usually defines the thickness of foam material to be produced within zone 14. Although only one set of dams 71 is shown, which may be, for example, a set having dams of a thickness of ¾ inch (the dams are shown in exaggerated thickness or height in FIGURE 1 for clearer illustration), the dams are releasably mounted and may be removed and replaced by dams of other thicknesses as desired to provide other thicknesses of foam material. Conveyors 67 and 68 may be adjustably movable toward and away from each other to provide for the use of a variety of sizes of dams 71 or one conveyor may be rigidly mounted with the other spring or gravity urged toward the mounted conveyor with the dams 71 providing the desired spacing. Suitable means providing such adjustability are shown more clearly in FIGURES 6 and 7 and will be discussed in more detail hereinbelow.

Conveyors 67 and 68 are mounted on drive rollers 74 and 73 and driven rollers 78 and 77 respectively. The drive and driven rollers are rotatably mounted in a casing wall or housing 88 which encloses the top, bottom and sides generally of the assembly of conveyors, and which also encloses the ends except the receiving and discharge slots aligned with zone 14. Drive roller 73 is driven by electric motor 79 through chain and sprocket 80. Drive roller 73 in turn drives drive roller 74 through a gear box 81 providing a one-to-one gear ratio with reversed output. The drive and driven rollers include sprockets (not shown) which engage within the channel portions of plates 69 to drive and support each conveyor belt. The lower reach of conveyor 67 and the upper reach of conveyor 68 are both driven at the same speed to the left as viewed in FIGURE 1. The speed of driving in the illustrated apparatus provides a residence time of about one minute for the material being pulled through curing zone 14 by the two opposing conveyors. However, motor 79 may be of variable speed or the sprocket drive ratio may be altered to increase or decrease the conveyor speed as desired.

The motor 79 may be provided on an adjustable base, if desired, to take up any slack or provide slack as may be necessary for adjustment of lower conveyor 68; alternatively, drive belt 80 may be replaced or other provision which may be apparent to those in the art may be made. Further it should be apparent that gear box 81 is capable of picking up or creating slack between conveyors 67 and 68 so that the conveyors may be moved further apart or closer together.

Secured to the bottom of housing 88 and mounted on suitable brackets are a pair of motor driven rotary cleaning brushes 82 which are driven counterclockwise as viewed in FIGURE 1 and against rotation of the conveyor belt 68 for cleaning the conveyor belt. As illustrated, two brushes 82 are provided and are mounted and spaced to clean dams 71 on the conveyor belt 68 and the conveyor belt itself adjacent dam 71. Motor driven cleaning brushes 82 are also provided mounted to the top of casing 88 and driven against conveyor belt 67 aligned with the position where conveyor belt 67 comes into contact with dams 71. The cleaning brushes are provided to clean any residue of foamable compound which may seep from between the backing material adjacent the lateral edges of the conveyor belt.

Additionally, secured to the lower portion of frame 88 is a receptacle 83 which contains a release agent such as molten wax for the purpose of waxing the belt 68 at dams 71 and adjacent dams 71 for easier release of cured foam therefrom. Receptacle 83 may include an electrical heater element if desired although usually sufficient heat will be supplied from the curing zone for keeping the wax or other release agent in liquid state, e.g. heat transferred to the release agent from plates 69 by means of the brushes or by means of radiation. Waxing brushes were not provided for conveyor 67 since some of the release agent on dams 71 on conveyor 68 is transferred to conveyor 67 due to contact between conveyor 67 and dams 71.

An oil furnace 87 is mounted on top of casing 88 and is provided for the purpose of supplying hot air at regulated temperature for heating curing zone 14. Oil furnace 87 is of conventional design and is preferably a furnace which includes a blower for exhausting hot air through the outlet thereof for use for heating purposes. Casing 88 is insulated, e.g., with sheet insulation material produced by the illustrated apparatus. Furnace 87 is supplied with oil by valved oil supply line 89 and is supplied with air through cold air intake duct 90.

Furnace 87 is disposed to force hot air through outlet 91, hot air duct 92 and hot air oven inlet 93 into the oven chambers 94 where the hot air is circulated for heating zone 14 generally through plate 69. Cold air outlet 97 is provided for discharge of air from oven chambers 94 and recirculation to cold air return duct 90 by way of port 98.

Turning now to the cutting zone 17 downstream from curing chamber 14, the cutting zone is exemplified by a traveling cut of saw with circular saw blade 101 mounted on saw arbor motor 102 as illustrated in FIGURE 5. The rotating saw blade 101 and motor 102 is moved across the material by means of a quadruple thread screw powered by motor 103. Saw blade 101, motor 102, quadruple thread screw and motor 103 are mounted on a bridge 104. The bridge 104 is slidably mounted on a pair of parallel guide rods 105 and driven by a chain 106 through a clutch C mounted on the bridge 104. The chain 106 is driven from drive roller 73. When bridge 104 and chain 106 is engaged by clutch C, the bridge moves in the direction of material flow. Bridge 104 is synchronized with lower conveyor 68. Chain 106 and conveyor 68 have the exact same linear speed.

The clutch C is controlled by a limit switch LS mounted in such a way that it will be actuated by the moving foam material. Limit switch LS also controls the motor 103.

As the foam material actuates the limit switch LS, the clutch C grips the chain 106 and thereby the bridge 104 is set in motion and at the same linear speed as the speed of the foam material or conveyor 68. Simultaneously, limit switch LS starts motor 103 which feeds the rotating saw blade 101 and motor 102 across the bridge, thus cutting off the material to length. When the saw blade 101 has completed its cut-off stroke, a second limit switch is actuated, and clutch C releases its grip on the chain 106, and the bridge 104 is returned to its starting position by means of a hydraulic or pneumatic cylinder (not shown).

A receiving platform 107 carrying rollers 108 is disposed beyond the cutting zone 17 within the product receiving zone 18. Platform 107 may be a conveyor extending to a storage area. Alternatively, platform 107 may be spring-loaded or geared to drop each time a length of roofing material is cut on discharge from zone 14 so that the materials may be stacked after cutting rather than being conveyed by a conveyor to another area. Additionally, receiving platform 107 may be mobile so that, upon receiving a stack of roofing panels, the platform may be removed to a storage area for outloading. However, because of the lightness of the panels which may be produced in accordance herewith, the panels may readily be removed from platform 107 and may be hand-conveyed to storage.

Further, the receiving area may be provided with means for actuating cutting of panels upon progression of a predetermined length, e.g., 8 foot, beyond the cutting station. Means for providing such cutting responsive to panel length will be apparent to those in the art.

Figure 7:
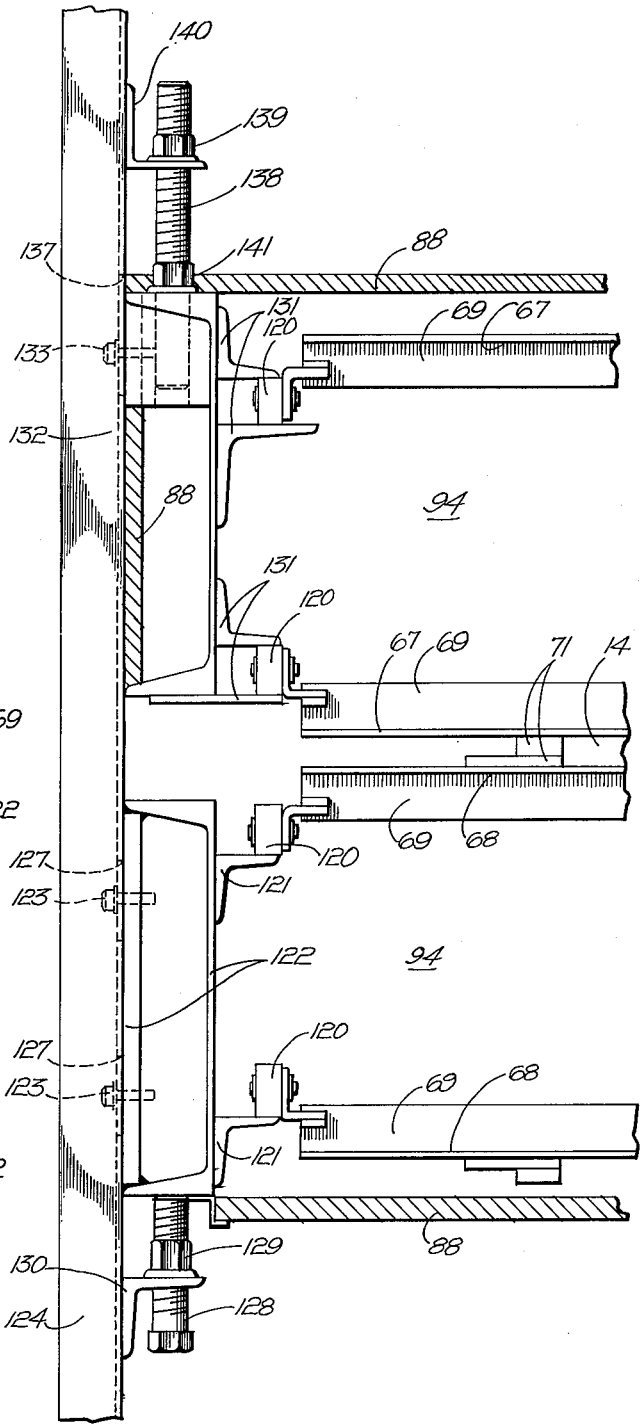
FIGURE 7 is a section along line 5—5 of FIGURE 4.

As indicated above, the gap between conveyors 67 and 68, which defines the vertical limits of curing chamber 14, is adjustable. Although many suitable means for adjusting gaps between conveyor belts are known to the art and will be apparent to those skilled in the art, a particular conveyor adjustment is provided in the illustrated embodiment and will now be further described. FIGURES 6 and 7 best illustrate the particular mounting means to be described.

The channel-shaped plates 69 are hinged together to form the continuous conveyor belts 67 and 68. A plurality of rollers 120 is provided, e.g., one roller at the lateral edges of each plate 69.

First, with respect to lower conveyor 68, tracks 121 are provided and secured to an adjustable bracket 122 for supporting rollers 120 of the lower conveyor. Bracket 122 is an assembly of a channel and plate best seen in cross-section in FIGURE 7. Bolts 123 are used for releasably and adjustably securing each bracket 122 to suitable framework, e.g., leg 124. A plurality of brackets 122 is provided with tracks 121 extending therebetween and supported thereby; for example, one of brackets 122 may be provided adjacent each end of the upper and lower reaches of conveyor 68 mounted by bolts 123 on each leg 124.

Each leg 124 is provided with adjusting slots 127 in which bolts 123 are slidable vertically. However, bolts 123 have heads of sufficient size so that when bolts 123 are driven tightly into threaded receptacles in bracket 122, the heads clamp against leg 124 laterally of slots 127 to secure bracket 122 against vertical (and lateral) movement.

An adjusting bolt 128 is slidable through a bracket 130 welded or otherwise suitably secured to leg 124. Above bracket 130 and threaded on bolts 128 is adjusting nut 129. Bolt 128 is positioned to contact the lower surface of bracket 122.

In order to adjust the vertical disposition of belt 68, bolts 123 are loosened to permit sliding in slots 127, and bolt 128 and nut 129 are adjusted, e.g. by securing nut 129 against rotation and rotating bolt 128, to force bracket 122 upward or permit downward movement of bracket 122 under the weight of the conveyor to the desired level. Bolts 123 are then tightened to clamp bracket 122, and therefore conveyor 68, in the desired vertical disposition. The same adjustable assembly as discussed hereinabove with respect to adjustment of conveyor 68 is provided on the other lateral edge of the conveyor and both lateral edges are raised or lowered as described hereinabove to raise and lower the conveyor.

Turning now to conveyor 67, adjustment of the vertical disposition of this conveyor may be accomplished in a similar manner. Accordingly, there is provided a double track 131 within which rollers 120, e.g., of a plurality and spacing similar to that of rollers 120 on conveyor 68, are adapted to travel. Tracks 131 are secured to bracket 132 which is an adjustable channel bracket and includes an upper block portion. Bolts 133 and slots 137 are provided for securing the bracket, by means of the upper block portion, to leg 124 and for releasing the same for vertical adjustment.

The adjusting bolt 138 is threaded into the upper block of bracket 132 and is locked therein by a lock nut 141. Adjusting bolt 138 carries adjusting nut 139. It is apparent that turning adjusting nut 139 will cause raising or lowering of the conveyor 67. Again, although only one adjustable support is shown for one lateral edge of conveyor 67, it is to be understood that a plurality of brackets are provided for support of tracks 131 and adjustment thereof on each lateral edge of conveyor 67.

Referring especially to FIGURE 7, it may be noted that the upper track 131 is a double track, including track surfaces both above and below the rollers 120. The upper track surfaces of track 131 prevent pushing of conveyor 67 upwardly under pressures which might be developed within zone 14.

In operation of the device illustrated in FIGURES 1–7, rolls 20 and 50 are unwound sufficient to feed or thread backing material 22 and 52 from the backing material supply through rollers 57 and 58, preheat zone 13 and curing zone 14. The backing material may be placed within the inlet end of zone 14 and a piece of paneling having the thickness of dam 71 may be placed on top of the two sheets of backing material. Motor 79 may then be started to feed the backing material through zone 14; the piece of paneling progresses through zone 14 pulling the sheets 22 and 52 thereafter. A liquid foamable resin mix is then discharged in a zigzag design as illustrated by reference numeral 115 between the upstanding edges on backing paper 22, which edges are folded by paper folder 27 prior to disposition of backing material 22 beneath nozzle 30.

The uncured liquid foamable resin mix introduced by nozzle 30 may be any of the suitable well-known liquid foamable mixes which are foamable to a rigid foam. Usually such mixes include reactive components which are mixed immediately prior to use and, for this reason, mixing chamber 31 is provided, the mixing chamber being supplied with the components of the mix by means of lines 32 and 33 and additional lines as desired or needed for the particular formulation. Advantageously, the reactive resin components may be reactive when mixed to cause condensation polymerization under conditions well known to those in the art to form a rigid mass, although the formation of additional polymer materials may also be possible. The polyurethane type foamable materials are preferred because of their adhesive properties which give an excellent bond between the foam and backing material without the use of extraneous adhesives. Thus, in a typical component of the mix introduced through line 32, there may be a resin capable of condensation polymerization with an isocyanate, a catalyst, a surfactant and a foaming agent, such as a volatile or vaporizable foaming agent or a gas forming reactant foaming agent. The surfactant functions to modify the liquid-gas interface to provide uniform small cells during foaming. The other component of the mix, introduced through line 33 would be an isocyanate for reacting with the resin.

As a more particular example, the component introduced to line 32 may include 30.60 parts by weight Wyandotte Chemical resin EX–185 which is a polyether resin containing a flame retardant, 4.15 p.b.w. Union Carbide LA–700 or Wyandotte Quadral, 16.50 p.b.w. Freon 11 (B.P. 74.5° F.), Freon 11b, Yukon 11, Genteron 11, Isotron or the like, all of which are low boiling fluorocarbons boiling above room temperature but below the preheat and curing temperatures, 0.20 p.b.w. N,N,N',N'-tetramethyl 1,3-butane diamine, 0.05 p.b.w. dibutyl tin dilaurate and 1.00 p.b.w. Dow Corning DC–113 silicone fluid.

The other component, i.e. introduced through line 33 may be 47.50 p.b.w., based on the parts by weight of the ingredients of the first component above, of polymethylene polyphenylisocyanate.

The reaction of the reactive resin with isocyanate to form the polyurethane is an exothermic reaction and where a volatile foaming agent, e.g., fluorocarbon, is used, the foaming agent boils within the reaction temperature, and preferably within a range of 60–110° F. Other suitable systems will be apparent to those in the art.

The liquid foamable resin mix is deposited by nozzle 30 on backing material 22 and the backing material 22, resin mix and backing material 52 are sandwiched between rollers 57 and 58, drawn between lamps 61 and 62 for preheating to about 100° F. and the sandwich is then drawn into and through zone or chamber 14 with the conveyors supplying the pulling power to the sandwich. As the sandwich travels between lamps 61 and 62 and the inlet to zone 14, the foamable resin mix is expanding due to vaporization of the foaming agent. The foam is cured in zone 14, the speed of the conveyors providing sufficient time in zone 14 for the desired curing.

The cured sandwich is discharged from the outlet zone 14 and is cut to desired lengths and received at 18. The one minute residence time is not sufficient to completely cure the product, however, the produce is sufficiently rigid not to materially change its form, during later curing outside of zone 14.

Advantageously, the apparatus and process described herein is capable of providing sufficiently long cream times and sufficiently short cure times for production of excellent foamed material. In the process, using the illustrated apparatus, the cream time, i.e., the time between mixing of resin components in mixer chamber 31 and the initiation of volatilization of the foaming agent by preheaters 61 and 62, may be adjusted and may be maximized, e.g. by controlling the speed of motor 79 or by changing the disposition of lamps 61 and 62 (upstream or downstream), to provide the maximum cream time without an undesirable degree of setting of the polymer reaction mixture.

The maximum or optimum cream time, will, of course, differ with many different reactant systems, the reactants themselves as well as the catalyst system used having some effect on optimum cream time. The optimum cream time permits the use of shorter curing times. In the example of operation given above, the curing time was one minute. Further, the preheater lamps 61 and 62 were disposed to permit a twelve second cream time between mixing of the reactants in chamber 31 and initiation of the foaming of the resin mix, i.e., a twelve second cream time which is considered optimum for the mix utilized. With regard to the optimum cream time, it is fully intended that the apparatus may be modified by lengthening or shortening various physical portions thereof or by controlling the speed of the resin mix through the apparatus to give the desired cream time or desired ratio of cream time to curing time for a particular resin mix.

It should be apparent from the foregoing description of the apparatus and method that the system is controllable, e.g., for production of panels of a wide variety of thicknesses. The rate of flow of liquid foamable compound from nozzle 30 may be controlled, e.g., by means of valves 34 and 35 or other flow control means. The spacing between rollers 57 and 58 and the disposition of the conveyors 67 and 68 may be adjusted to provide the proper ratio of roller spacing to conveyor spacing for a given foamable compound based on the expansion factor of the compounds to be used. The replaceable dams also are useful in providing more advantageous adaptability of the conveyor to a variety of thicknesses.

The rate of flow of liquid foamable compound from the nozzle is preferably controlled to maintain a continuous mass or dam of liquid resin mix behind rollers 57 and 58 between the sheets of backing material so that the liquid will spread uniformly between the two sheets. The size of the mass or dam of liquid behind the rollers may advantageously be maintained at a constant size by regulation of the rate of flow of liquid resin mix from the nozzle. Preferably a nozzle and mixer capable of giving a truly constant rate of flow is preferred to eliminate the possibility of continual necessary readjustment of the rate of liquid flow during the process. Such a device is described in the aforementioned patent application. Further, the dam or mass of liquid behind the rollers is maintained in a sufficiently small mass to prevent overloading of roller 57.

Turning now to FIGURE 8, a product roofing panel is illustrated generally at 110. The panel is composed of a foamed plastic 111 cured to rigidity and sandwiched between a backing sheet 22 and a backing sheet 52. Side dams 28, provided by the upstanding edges of backing sheet 22, enclose at least a portion of two opposing edges of the panel. Dams 28, in the illustrated form, are partially embedded in foam 111 providing a continuous generally planar surface across the lateral edge of panel 110. The products provided, e.g. roofing panels, include foams of very low density and usually have a density less than 2 lb. 1 cu. ft. The foam is preferably rigid polyurethane.

We claim:

1. An apparatus for continuous production of sheets of roofing or insulating material, which apparatus comprises means for folding upstanding edges along a first continuous sheet of backing material, means for introducing a foamable liquid resin mix on the sheet of backing material between said folded edges at a receiving station, horizontally disposed and generally vertically aligned and spaced rollers, said rollers being disposed to receive the mix and backing sheet and a second separate backing sheet disposed thereover fed between said rollers to sandwich the mix between the two backing sheets, means for heating both backing sheets at a temperature above foaming temperature and below curing temperature of the foamable resin, a curing zone maintained at curing temperature, selectively adjustably uniformly vertically spaced opposing movable conveyors adapted to vertically confine said sandwich to a preselected vertical thickness, said conveyors adapted to direct the sandwich through said curing zone from one end thereof to the other end thereof each of said conveyors comprising a continuous belt of laterally disposed closely spaced hinged plates, removable and replaceable dam means upstanding the distance of said preselected vertical thickness from and secured to the separate plates of the lower conveyor adjacent each edge and adapted to support said upstanding lower sheet edges throughout said curing zone, means for coating said dam means with release agent, means for adjusting the vertical spacing of said conveyors, means for adjusting the spacing of said rollers, means for controlling the rate of foamable mix introduction to provide a generally constant amount of liquid behind said rollers sufficient to assure uniform spreading of the liquid, means receiving the resulting continuous foamed sheet from the other end of said curing zone, and means for cutting the cured continuous sheet to desired length.

2. An apparatus for continuous production of sheets of roofing material, which apparatus comprises a first supply of flexible backing material, means for folding upstanding edges along opposing edges of a first continuous sheet of backing material from said first supply, a laterally reciprocable mixer and nozzle for introducing a foamable liquid mix on the sheet of backing material between said folded edges, a pair of horizontally disposed and generally vertically aligned and spaced rollers, a second supply of flexible backing material, said rollers being adapted to receive said first sheet of backing material and liquid mix thereon and a second separate backing sheet from said second supply disposed over the first backing sheet and liquid to sandwich the liquid between the two backing sheets, means for heating both backing sheets at a temperature above foaming temperature and below curing temperature of the foamable mix, a curing zone maintained at curing temperature, conveying means for vertically confining said sandwich and directing and conveying the sandwich through said curing zone from one end thereof to the other end thereof, dam means supporting said upstanding lower sheet edges and preventing lateral leakage of liquid throughout said curing zone, said dam means being secured to said conveying means and carried outside of said curing zone and re-entering said curing zone during operation of said conveying means, a reservoir of release agent, rotary brush means for conveying release agent from said reservoir to said dam means with said dam means disposed outside of said curing zone, and means receiving the resulting continuous foamed sheet from the other end of said curing zone.

3. In foamboard production apparatus having supply means from which a pair of vertically spaced sheets of continuous sheet material are advancing, nozzle means depositing a liquid foamable polyurethane resin mix onto at least one of the advancing sheets at a receiving station, selectively adjustable spreading means adapted to spread the resin mix in any of a variety of uniform thicknesses whereby a preliminary control of the thickness of the foamboard is achieved, and a curing oven in which the advancing precursor sandwich of upper and lower sheets and intermediate resin is transformed into foamboard, the improvement which consists of the combination of: a pair of upper and lower endless belt conveyor means comprising closely spaced hinged plates; means for selectively adjusting the vertical spacing between the jointly advancing parallel plates of the upper and lower conveyor means, whereby a secondary control over the thickness of the foamboard is achieved, said advancing plates applying pressure across the width of the advancing precursor during at least a portion of the advancement through the curing oven by reason of the spacing being less than the thickness attainable by the free rise of the foamable resin mix; and dam means adapted to engage each edge of the advancing foamboard and to define the width thereof, each of said dam means being detachably secured to a plate of the bottom conveyor means in such a manner that a set of dam means are readily removed and replaced by a set of dam means of another thickness and the spacing between the conveyors being adjusted so that the upper conveyor plates touch the tops of such dam means, thereby providing lateral limits of expansion of the foamable material.

4. The invention of claim 3 in which there is a release agent application station through which that portion of the lower endless belt remote from the advancing foamboard is directed, a reservoir of release agent associated with said application station, and means directing release agent from said reservoir onto the edges of the dams engaging the edges of the advancing foamboard.

References Cited by the Examiner
UNITED STATES PATENTS

| | | | |
|---|---|---|---|
| 565,336 | 8/96 | Ehret | 156—550 |
| 1,348,387 | 8/20 | Armstrong | 156—40 |
| 2,836,221 | 5/58 | Bove | 156—550 |
| 2,841,205 | 7/58 | Bird | 161—161 |
| 2,866,730 | 12/58 | Potchen et al. | 156—78 X |
| 2,929,793 | 3/60 | Hirsh. | |
| 2,962,407 | 11/60 | Aykanian | 156—78 |
| 2,993,871 | 7/61 | Shannon et al. | 156—79 X |
| 3,041,220 | 6/62 | Martin et al. | 161—161 |
| 3,043,730 | 7/62 | Adie | 161—68 |
| 3,047,449 | 7/62 | Coble | 156—79 |

EARL M. BERGERT, *Primary Examiner.*

MORRIS SUSSMAN, *Examiner.*

UNITED STATES PATENT OFFICE

CERTIFICATE OF CORRECTION

Patent No. 3,215,581                         November 2, 1965

Floyd E. Carlson et al.

It is hereby certified that error appears in the above numbered patent requiring correction and that the said Letters Patent should read as corrected below.

In the grant, lines 1 and 2, and in the heading to the printed specification, lines 3 and 4, name of third inventor, for "Nile Einar Swedberg", each occurrence, read -- Nils Einar Swedberg --.

Signed and sealed this 29th day of November 1966.

(SEAL)
Attest:

ERNEST W. SWIDER                       EDWARD J. BRENNER
Attesting Officer                         Commissioner of Patents